(12) United States Patent
Cao et al.

(10) Patent No.: US 12,494,839 B2
(45) Date of Patent: Dec. 9, 2025

(54) SYSTEM AND METHOD ON RESOURCE INDICATION SIGNALING

(71) Applicant: ZTE CORPORATION, Guangdong (CN)

(72) Inventors: Wei Cao, Shenzhen (CN); Nan Zhang, Shenzhen (CN); Yachao Yin, Shenzhen (CN); Jianfei Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 13 days.

(21) Appl. No.: 17/886,225

(22) Filed: Aug. 11, 2022

(65) Prior Publication Data

US 2022/0393754 A1     Dec. 8, 2022

Related U.S. Application Data

(63) Continuation of application No. PCT/CN2020/075386, filed on Feb. 14, 2020.

(51) Int. Cl.
| | |
|---|---|
| *H04B 7/10* | (2017.01) |
| *H04B 7/155* | (2006.01) |
| *H04B 7/185* | (2006.01) |
| *H04L 5/00* | (2006.01) |

(52) U.S. Cl.
CPC ............. *H04B 7/10* (2013.01); *H04B 7/1555* (2013.01); *H04B 7/18528* (2013.01); *H04B 7/18539* (2013.01); *H04L 5/0048* (2013.01)

(58) Field of Classification Search
CPC .... H04B 7/10; H04B 7/1555; H04B 7/18528; H04B 7/18539; H04L 5/0048; H04L 5/0044; H04L 5/0023; H04L 5/0053; H04W 48/12; H04W 8/24; H04W 72/046; H04W 72/21; H04W 72/23
See application file for complete search history.

(56) References Cited

U.S. PATENT DOCUMENTS

| | | | |
|---|---|---|---|
| 2017/0033848 | A1 | 2/2017 | Cordeiro |
| 2018/0063693 | A1* | 3/2018 | Chakraborty ......... H04W 8/005 |
| 2019/0123869 | A1 | 4/2019 | Kakishima et al. |
| 2020/0166623 | A1* | 5/2020 | Sahin ..................... G01S 7/006 |
| 2021/0058138 | A1* | 2/2021 | Tani ........................ H04B 7/10 |

(Continued)

FOREIGN PATENT DOCUMENTS

| | | |
|---|---|---|
| CN | 106664192 A | 5/2017 |
| CN | 109155766 A | 1/2019 |
| CN | 110431756 A | 11/2019 |

(Continued)

OTHER PUBLICATIONS

Machine English translation CN 115134882 (Year: 2019).*

(Continued)

*Primary Examiner* — Sam K Ahn
*Assistant Examiner* — Amneet Singh
(74) *Attorney, Agent, or Firm* — Foley & Lardner LLP

(57) ABSTRACT

A system and method of improving resource switching efficiency by using polarization capabilities of beams within a network. The system and method include receiving, by a wireless communication device from a base station, polarization information. The system and method include respectively reporting, by the wireless communication device to the base station, polarization capabilities of the wireless communication device.

8 Claims, 14 Drawing Sheets

| SSB index | Polarization direction | Mapping rule |
|---|---|---|
| 0,1,2,3,8,9,10,11 | L | $\left\lfloor \dfrac{\text{SSB index}}{4} \right\rfloor$ is even |
| 4,5,6,7,12,13,14,15 | R | $\left\lfloor \dfrac{\text{SSB index}}{4} \right\rfloor$ is odd |

(56) References Cited

U.S. PATENT DOCUMENTS

2022/0407546 A1* 12/2022 Nishio .................. H04W 72/23

FOREIGN PATENT DOCUMENTS

| CN | 115134882 | * | 11/2019 | |
|---|---|---|---|---|
| EP | 4 057 530 A1 | | 9/2022 | |
| WO | WO-2014/126319 A1 | | 8/2014 | |
| WO | WO-2019/141499 A1 | | 7/2019 | |
| WO | WO-2020192892 A1 | * | 10/2020 | ........... H04B 7/0617 |
| WO | WO-2021/058576 A1 | | 4/2021 | |

OTHER PUBLICATIONS

Extended European Search Report on EP 20889146.5 dated Sep. 11, 2023 (11 pages).

International Search Report and Written Opinion for PCT Appl. No. PCT/CN2020/075386 mailed Nov. 18, 2020 (8 pages).

First Office Action and Search Report for CN App. No. 202080096329.6 dated Jul. 18, 2024 (with English translation, 32 pages).

Catt, "UE capability discussion for NTN," 3GPP TSG RAN WG1 Meeting #99; R1-1912167; Reno, USA; Nov. 18-22, 2019 (2 pages).

Huawei, et al., "Discussion on physical layer control procedures for NTN," 3GPP TSG RAN WG1 Meeting #99; R1-1911859; Reno, USA; Nov. 18-22, 2019 (5 pages).

Office Action for KR App. No. 10-2022-7028102 dated Jan. 14, 2025 (with English translation, 7 pages).

Panasonic, "Discussion on beam management and polarization for NTN," 3GPP TSG RAN WG1 #99; R1-1912902; Reno, USA; Nov. 18-22, 2019 (3 pages).

Thales, "FS_NR_NTN_solutions: Study on solutions for NR to support non-terres trial networks (NTN)," 3GPP TSG-RAN WG3 Meeting #106; R2-197003; Reno, USA; Nov. 18-22, 2019 (5 pages).

Communication pursuant to Article 94(3) EPC for EP Appl. No. 20889146.5 dated Apr. 16, 2025 (2 pages).

* cited by examiner

1200 receiving, by a wireless communication device from a base station, polarization information
1202 reporting, by the wireless communication device to the base station, polarization capabilities of the wireless communication device
1204

1300 transmitting, by a base station to a wireless communication device, polarization information
1302 receiving, by the base station from the wireless communication device, polarization capabilities of the wireless communication device
1304

SYSTEM AND METHOD ON RESOURCE INDICATION SIGNALING

CROSS-REFERENCE TO RELATED APPLICATION

This application claims the benefit of priority under 35 U.S.C. § 120 as a continuation of PCT Patent Application No. PCT/CN2020/075386, filed on Feb. 14, 2020, the disclosure of which is incorporated herein by reference in its entirety.

TECHNICAL FIELD

The disclosure relates generally to wireless communications and, more particularly, to systems and methods for improving resource switching efficiency by using polarization information of beams within a network.

BACKGROUND

The standardization organization Third Generation Partnership Project (3GPP) is currently in the process of specifying a new Radio Interface called 5G New Radio (5G NR). With the development of 5G NR, a broad range of use cases including enhanced mobile broadband, massive machine-type communications (MTC), critical MTC, etc., can be realized. To expand the utilization of NR access technologies, 5G connectivity via satellites and/or airborne vehicles is being considered as a promising application.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method includes receiving, by a wireless communication device (e.g., UE 304 in FIG. 3) from a base station (e.g., BS 302 in FIG. 3), polarization information. In some embodiments, the method includes reporting (e.g., transmitting, sending, delivering, broadcasting, etc.), by the wireless communication device to the base station, polarization capabilities of the wireless communication device.

In some embodiments, receiving the polarization information includes monitoring (e.g., observing, watching, managing, etc.), by the wireless communication device, the polarization information being signaled by the base station. In some embodiments, the signaling includes one or more of system information, Radio Resource Control (RRC) configuration, or handover configuration.

In some embodiments, the signaling includes at least one of a first association between Reference Signals (RSs) and a plurality of frequency resources; a second association between the RSs and the polarization information; or a third association between channels and the polarization information. In some embodiments, the polarization information is for at least one neighboring (e.g., adjacent, nearby, contiguous, etc.) beam of the plurality of beams that neighbors a serving beam.

In some embodiments, the RS includes at least one of a Demodulation Reference Signal (DM-RS), a Channel State Information Reference Signal (CSI-RS), a Synchronization Signal Block (SSB), a Sounding Reference Signal (SRS), or Positioning Reference Signals (PRS).

In some embodiments, the channel includes at least one of a Physical Downlink Shared Channel (PDSCH), a Physical downlink control channel (PDCCH), a Physical Uplink Shared Channel (PUSCH), or a Physical Uplink Control Channel (PUCCH).

In some embodiments, the polarization information is mapped (e.g., grouped, linked, associated, categorized, etc.) to SSB indexes of the SSBs based on the at least one of the first association, the second association, or the third association.

In some embodiments, the at least one of the first association, the second association, or the third association corresponds to a mapping rule between resource indexes and polarization.

In some embodiments, a first mapping rule includes an equation defined as, $$\left\lfloor \frac{Index_{resource}}{N} \right\rfloor = even.$$

In some embodiments, the first mapping rule further includes an equation defined as, $$\left\lfloor \frac{Index_{resource}}{N} \right\rfloor = odd.$$

In some embodiments, N is a first configurable parameter. N can be the number of supported polarization type(s), e.g., 2. In some embodiments, N is a resource reuse factor. In some embodiments, each index resource may be mapped to a specific polarization.

In some embodiments, a second mapping rule includes a set of equations defined as, mod (Index$_{resource}$, N)=I, (I<N). In some embodiments, N is a second configurable parameter. The first and second configurable parameters may be the same or different. N can be the number of supported polarization type(s), e.g., 2. In some embodiments, N is a resource reuse factor. In some embodiments, each index resource may be mapped to a specific polarization.

In some embodiments, the at least one of the first association, the second association, or the third association includes at least one of: the polarization information is included within configuration of corresponding ones of the RSs or corresponding ones of the channels; and the polarization information of the RSs or the channels follows a same polarization information of the RSs. In some embodiments, the same polarization information is used as reference RS for Quasi Co-Location (QCL) indication for the channels or the RSs. In some examples, the reference RS can be the reference RS for QCL type-A. In some examples, the reference RS can be the reference RS for QCL type-D. In some embodiments, the same polarization information is used as reference RS for spatial relationship association. In some examples, the spatial relationship association is configured using suitable parameter such as but not limited to, spatialRelationInfo. In some embodiments, the same polarization information is used as RS for scheduling indication. In some example, the RS for scheduling indication is the SRS indicated by an SRS Resource Indicator (SRI) that is carried in the scheduling information, e.g., DCI or configured grant information.

In some embodiments, the polarization information includes one or more of linear polarization, cross linear polarization, Left Hand Circular Polarization (LHCP), or Right Hand Circular Polarization (RHCP). In some embodiments, the polarization capabilities include capabilities for one or more of the linear polarization, the cross linear polarization, the LHCP, the RHCP, fixed polarization, supporting only circular polarization, supporting LHCP-only polarization, supporting RHCP-only, adjusting the polarization, or synthesizing circular polarization via linear polarization.

In some embodiments, the wireless communication device reports the polarization capabilities using a UECapabilityInformation message.

In some embodiments, the polarization capabilities includes first polarization capabilities of the wireless communication device for reception and second polarization capabilities of the wireless communication device for transmission. In some embodiments, the first polarization capabilities and/or the second polarization capabilities are defined using a single parameter or using two separate parameters.

In some embodiments, the first polarization capabilities and/or the second polarization capabilities correspond to each other.

In some embodiments, the polarization capabilities indicate that the wireless communication device supports Left Hand Circular Polarization (LHCP)-only polarization or Right Hand Circular Polarization (RHCP)-only polarization for transmission or reception, the wireless communication device receive signals via the supported LHCP-only polarization or the supported RHCP-only polarization.

In some embodiments, the polarization capabilities indicate that the wireless communication device supports adjusting (e.g., modifying, correcting, altering, regulating, etc.) the polarization from a first polarization to a second polarization for the transmission or the reception, the second polarization is applied or valid after a time gap $t_{offset}$ after scheduling or configuration corresponding to adjusting to the second polarization is detected by the wireless communication device.

In some embodiments, the polarization capabilities indicate that the wireless communication device supports only single polarization, which is the same polarization as reported in the polarization capability is expected to be used by the communication device for the communication between wireless communication device and node.

In some embodiments, the wireless communication device receives polarization used by the wireless communication device via UE-specific signaling.

In another embodiment, a method includes transmitting, by a base station to a wireless communication device, polarization information. In some embodiments, the method includes receiving, by the base station from the wireless communication device, polarization capabilities of the wireless communication device.

In some embodiments, the polarization information is for a resource including one or more of a cell, a target spot beam, neighboring beams, or Bandwidth Part (BWP).

In some embodiments, the method includes transmitting the polarization information includes signaling, by the base station, the polarization information. In some embodiments, the signaling includes one or more of system information, Radio Resource Control (RRC) configuration, or handover configuration.

In some embodiments, the signaling includes at least one of: a first association between Reference Signals (RSs) and a plurality of frequency resources; a second association between the RSs and the polarization information; or third association between channels and the polarization information. In some embodiments, the polarization information is for at least one neighboring beam of the plurality of beams that neighbors a serving beam.

In some embodiments, the RS includes at least one of Demodulation Reference Signal (DM-RS), Channel State Information Reference Signal (CSI-RS), Synchronization Signal Block (SSB), Sounding Reference Signal (SRS), or Positioning Reference Signals (PRS).

In some embodiments, the channel includes at least one of Physical Downlink Shared Channel (PDSCH), Physical downlink control channel (PDCCH), Physical Uplink Shared Channel (PUSCH), or Physical Uplink Control Channel (PUCCH).

In some embodiments, the polarization information is mapped to SSB indexes of the SSBs based on the at least one of the first association, the second association, or the third association.

In some embodiments, the at least one of the first association, the second association, or the third association corresponds to a mapping rule between resource indexes and polarization.

In some embodiments, a first mapping rule includes an equation defined as, $$\left\lfloor \frac{Index_{resource}}{N} \right\rfloor = \text{even}.$$

In some embodiments, the first mapping rule further includes an equation defined as $$\left\lfloor \frac{Index_{resource}}{N} \right\rfloor = \text{odd}.$$

In some embodiments, N is a first configurable parameter. N can be the number of supported polarization type(s), e.g., 2. In some embodiments, N is a resource reuse factor. In some embodiments, each index resource may be mapped to a specific polarization.

In some embodiments, a second mapping rule includes a set of equations defined as, mod ($Index_{resource}$, N)=I, (I<N). In some embodiments, N is a second configurable parameter. The first and second configurable parameters may be the same or different. N can be the number of supported polarization type(s), e.g., 2. In some embodiments, N is a resource reuse factor. In some embodiments, each index resource may be mapped to a specific polarization.

In some embodiments, the at least one of the first association, the second association, or the third association includes at least one of: the polarization information is included within configuration of corresponding ones of the RSs or corresponding ones of the channels; and the polarization information of the RSs or the channels follows a same polarization information of the RSs. In some embodiments, the same polarization information is used as reference RS for Quasi Co-Location (QCL) indication.

In some embodiments, the polarization information includes one or more of linear polarization, cross linear polarization, Left Hand Circular Polarization (LHCP), or Right Hand Circular Polarization (RHCP). In some embodiments, the polarization capabilities include capabilities for one or more of the linear polarization, the cross linear polarization, the LHCP, or the RHCP, fixed polarization, supporting only circular polarization, supporting LHCP-only polarization, supporting RHCP-only, adjusting the polarization, or synthesizing circular polarization via linear polarization.

In some embodiments, the base station receives the polarization capabilities using a UECapabilityInformation message.

In some embodiments, the method includes receiving the polarization capabilities of the wireless communication device includes receiving, by the base station, polarization capabilities from each of a plurality of wireless communication devices, the plurality of wireless communication devices includes the wireless communication device. In some embodiments, the method includes grouping, by the base station, the plurality of wireless communication devices based on the received polarization capabilities from each of the plurality of wireless communication devices.

In some embodiments, the method includes communicating, by the base station with the plurality of wireless communication devices having different polarization capabilities, data using Time Division Duplex (TDD) in a spot beam.

In some embodiments, communicating the data using TDD in the spot beam includes indicating, by the base station to the wireless communication device having only Left Hand Circular Polarization (LHCP), only Right Hand Circular Polarization (RHCP), an extra TDD period to realize Semi-Static Persistent (SSP) downlink/uplink grant or to realize periodic break in repetition-based transmission.

In some embodiments, the polarization capabilities include first polarization capabilities of the wireless communication device for reception and second polarization capabilities of the wireless communication device for transmission. In some embodiments, the first polarization capabilities and the second polarization capabilities are defined using a single parameter or using two separate parameters. In some embodiments, the first polarization capabilities and the second polarization capabilities correspond to each other.

In some embodiments, indicating, by the base station, the polarization used by the wireless communication device via UE-specific signaling. In some embodiments, using the polarization capabilities of the wireless communication device in the interference mitigation includes indicating, by the base station to the wireless communication device, to change first polarization of the wireless communication device to second polarization; and/or allowing, by the base station, a time gap $t_{offset}$ before communicating with the wireless communication device based on the second polarization, a length of the time gap being determined based on a trip propagation delay between the wireless communication device and the base station and processing delays by at least one of the base station or the wireless communication device associated with changing the first polarization to the second polarization.

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXEMPLARY EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

3GPP 3rd Generation Partnership Project
5G 5th Generation Mobile Networks
5G-AN 5G Access Network
5G gNB Next Generation NodeB
BWP Bandwidth Part
CSI Channel State Information
DL Down Link or Downlink
GEO Geostationary Earth Orbit
HAPS High Altitude Platform Station
ISL Inter-Satellite Links
LEO Low Earth Orbit
LHCP Left Hand Circular Polarization
MAC Media Access Control
MEO Medium Earth Orbit
MTC Machine-Type Communications
NR Next Generation RAN
NTN Non-Terrestrial Network
PCI Physical-Layer Cell Identity
PDCCH Physical Downlink Control Channel
PDSCH Physical Downlink Shared Channel
PUCCH Physical Uplink Control Channel
PUSCH Physical Uplink Shared Channel
RAN Radio Access Network
RAR Random Access Response
RHCP Right Hand Circular Polarization
RRC Radio Resource Control
SIB System Information Block
UAS Un manned Aerial System Platform
UE User Equipment
UL Up Link or Uplink With the development of the new radio (NR) access technologies (e.g., 5G), a broad range of use cases including enhanced mobile broadband, massive machine-type communications (MTC), critical MTC, etc., can be realized. To expand the utilization of NR access technologies, 5G connectivity via satellites and/or airborne vehicles is being considered as a promising application. A network (e.g., BS 302 in FIG. 3) incorporating satellites and/or airborne vehicles (e.g., satellite 506 in FIG. 5, satellite 606 in FIG. 6) to perform the functions (either full or partial) of terrestrial base stations is called a non-terrestrial network (NTN).

In NTNs, the coverage of a satellite or an airborne vehicle is generally implemented by multiple beams. Similar to typical terrestrial networks, resource (e.g., a frequency) reuse among beams can be adopted to improve resource efficiency.

Figure 1:
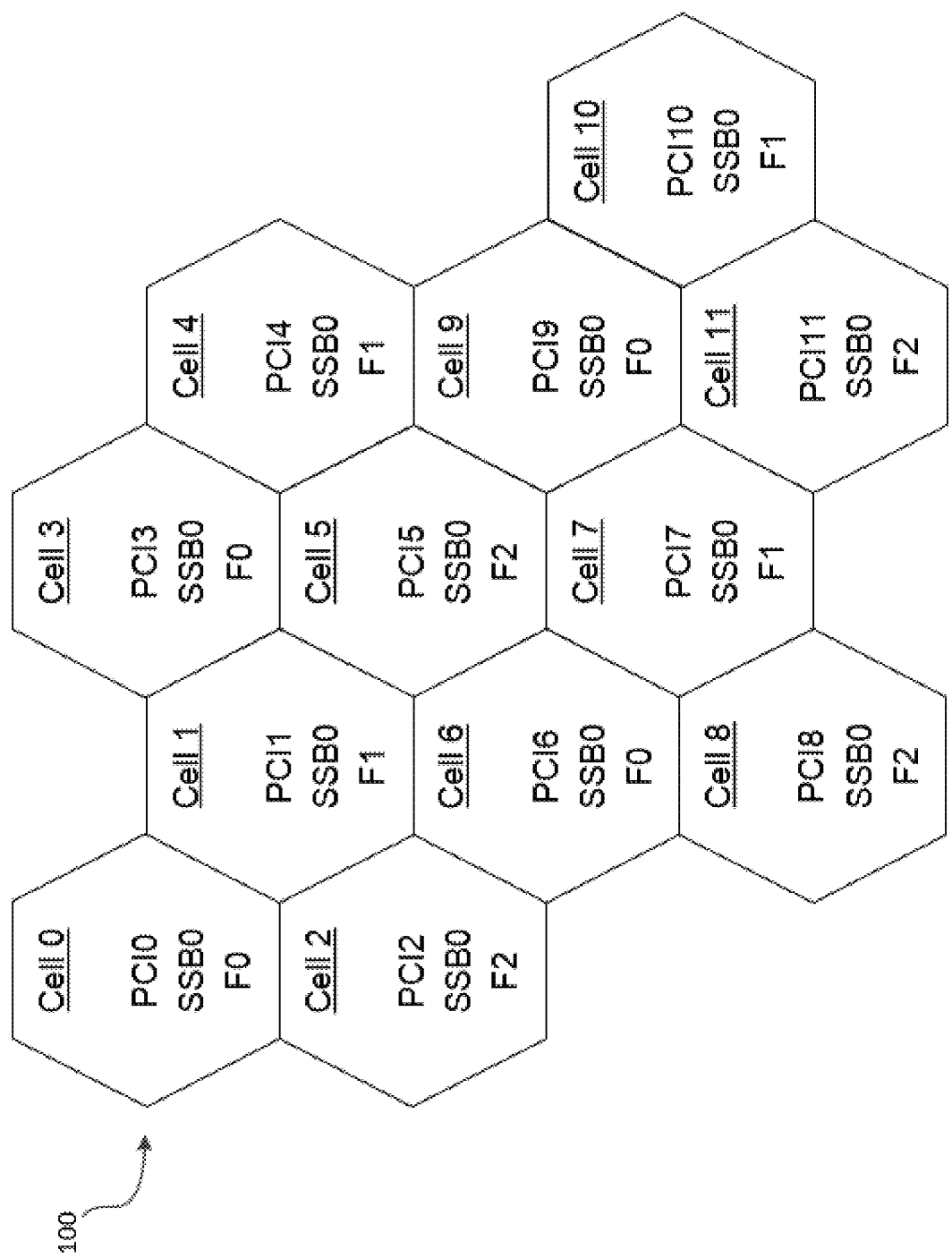
FIG. 1 illustrates a block diagram of an example frequency reuse schem of an area, in accordance with some embodiments of the present disclosure.

For example, FIG. 1 illustrates a block diagram of an example frequency reuse scheme of an area, in accordance with some embodiments of the present disclosure. The frequency reuse scheme 100 splits an area into a plurality of non-overlapping cells in order to utilize the full range of frequencies without interference. Each of the cells correspond to a unique Physical-Layer Cell Identity (PCI) (e.g., PCI0, PCI1, etc.), and are collectively associated with a Synchronization Signal Block 0 (SSB0). As shown, the frequency reuse scheme 100 applies a three-group scheme, in that a first frequency (e.g., F0) may be reused across a first group of cells (e.g., Cell 0, Cell 3, Cell 6, and Cell 9), a second frequency (e.g., F1) may be reused across a second group of cells (e.g., Cell 1, Cell 4, Cell 7, and Cell 10), and a third frequency (e.g., F2) may be reused across a third group of cells (e.g., Cell 2, Cell 5, Cell 8, and Cell 11). In some embodiments, some or all of the frequencies (e.g., F0, F1, and F2), may be different in order to reduce interference between the cells. Although FIG. 1 only shows the reuse of a select number of frequencies across a select number of cells, any number of frequencies may be used across any number of cells within an area.

In some embodiments, a UE (e.g., UE 304 in FIG. 3) with a Very Small Aperture Terminal (VSAT) antenna may be supported in NTN scenarios, which can use circular polarization in their transmission and reception. Thus, frequency reuse using circular polarization may be another resource reuse option.

Figure 2:
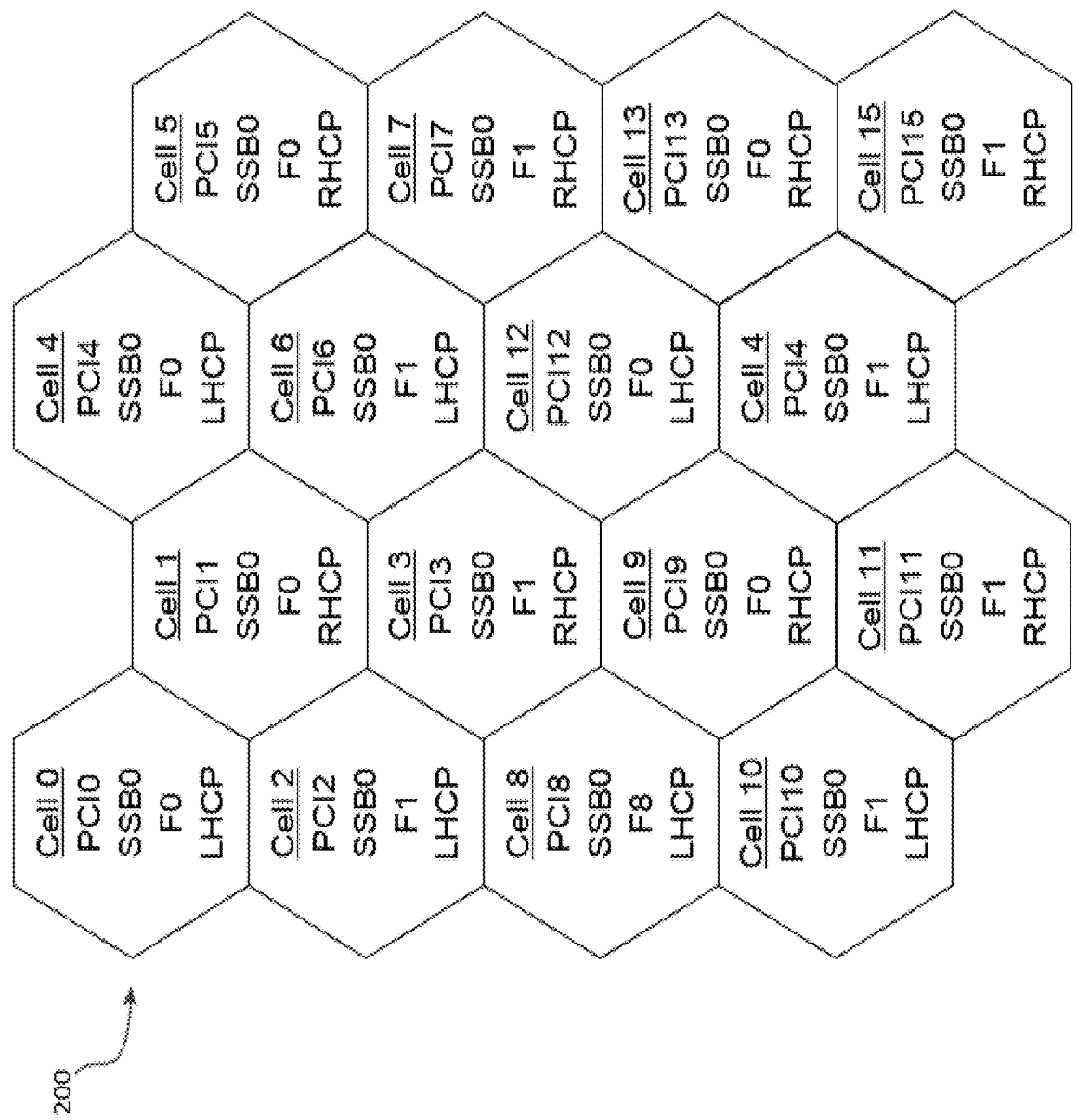
FIG. 2 illustrates a block diagram of an example frequency reuse schem of an area using circular polarization, in accordance with some embodiments of the present disclosure.

For example, FIG. 2 illustrates a block diagram of an example frequency reuse scheme of an area using circular polarization, in accordance with some embodiments of the present disclosure. The frequency reuse scheme 200 splits an area into a plurality of non-overlapping cells in order to utilize the full range of frequencies without interference. Each of the cells correspond to a unique PCI (e.g., PCI0, PCI1, etc.), and are collectively associated with SSB0. As shown, the frequency reuse scheme 200 applies a four-group scheme based on using different frequencies and different polarization capabilities. That is, a first frequency (e.g., F0) may be reused across a first group of cells (e.g., Cell 0, Cell 1, Cell 4, Cell 5, Cell 8, Cell 9, Cell 12, and Cell 13) and a second frequency (e.g., F1) may be reused across a second group of cells (e.g., Cell 2, Cell 3, Cell 6, Cell 7, Cell 10, Cell 11, Cell 14, and Cell 15). A third group of cells (e.g., Cell 0, Cell 2, Cell 4, Cell 6, Cell 8, Cell 10, Cell 12, and Cell 14) may use Left-Hand Circular Polarization (LHCP), and a fourth group of cells (e.g., Cell 1, Cell 3, Cell 5, Cell 7, Cell 9, Cell 11, Cell 13, and Cell 15) may use Right-Hand Circular Polarization (RHCP). In some embodiments, one or both of the frequencies (e.g., F0 and F1), may be different in order to reduce interference between the cells. Although FIG. 2 only shows the reuse of a select number of frequencies across a select number of cells using a select polarization capability, any number of frequencies may be used across any number of cells within an area and using any polarization capability (e.g., LHCP, RHCP, linear polarization, cross linear polarization, etc.).

On one hand, the polarization information of neighboring beams could be useful in beam switching. In some NTN scenarios, such as Low Earth Orbit (LEO) and High Altitude Platform Station (HAPS), the BS on board may move with high speed, which means frequent beam switching needed even for a stationary UE on the ground. In this case, known polarization of target beam could help the UE to complete its beam switching more quickly. On the other hand, it is possible to use polarization as an extra diversity dimension to improve network performance. For example, polarization can be used in interference mitigation.

In conventional 5G NR systems, however, the UEs do not share their polarization information and/or capabilities with a BS, nor is the BS even configured to perform the resource switching based on the polarization information. As such, the resource switching in conventional 5G NR systems is often performed in an inefficient manner.

Accordingly, the system and method discussed herein improve resource switching efficiency by using polarization capabilities of beams within a network.

Figure 3:
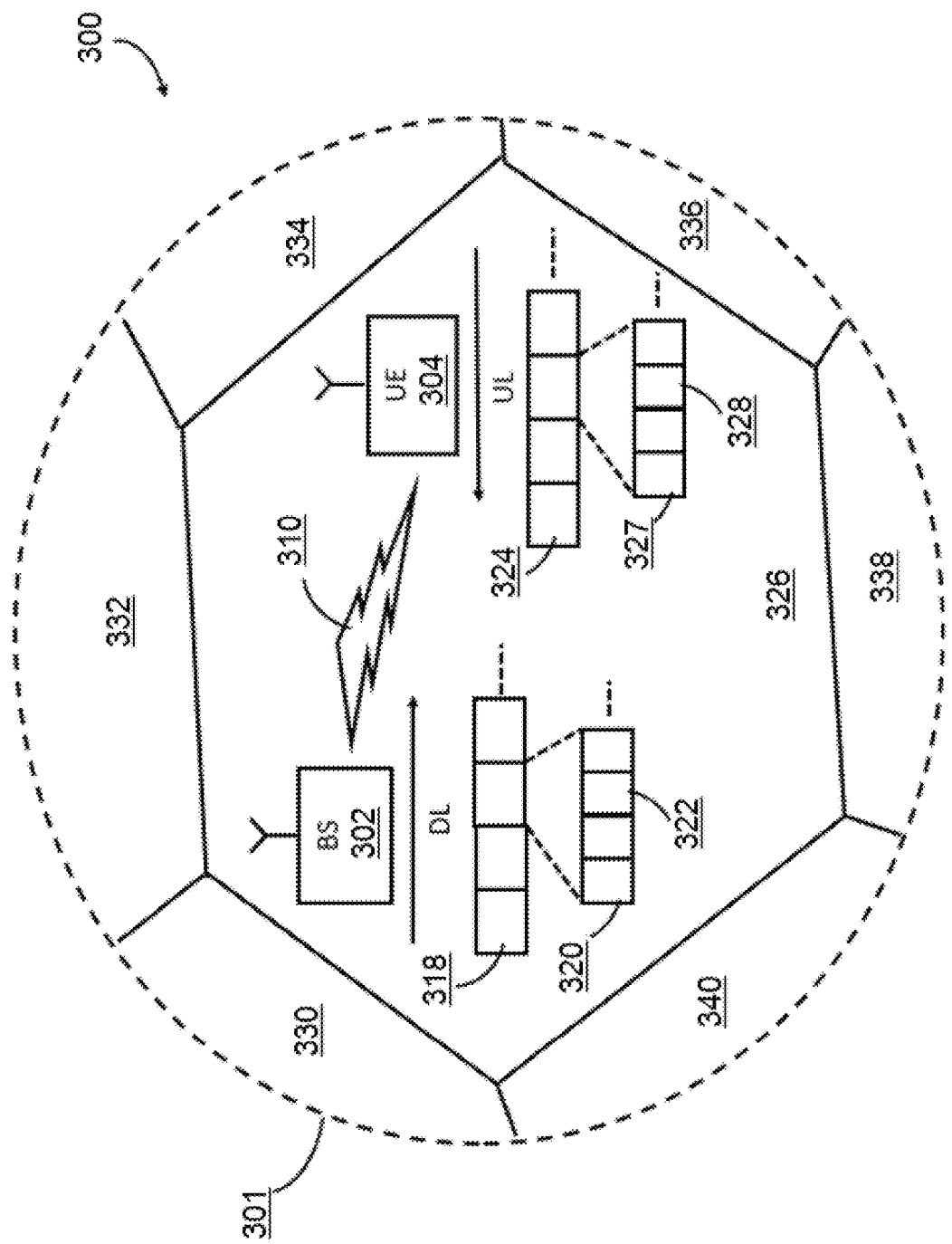
FIG. 3 illustrates an example cellular communication network in which techniques disclosed herein may be implemented, in accordance with an embodiment of the present disclosure.

By way of a non-limiting example, as discussed in greater detail below, the embodiments described herein may include one or more of the following features:

A "first feature" relates to a UE reporting the polarization capability of the UE (e.g., UE 304 in FIG. 3) to the BS (e.g., BS 302 in FIG. 3)

A "second feature" relates to the BS indicating the polarization of resource (e.g., cell/a target spot beam/neighboring beams/bandwidth part) to one or more UEs.

A "third feature" relates to serving one or more UEs with different polarization capability in a Time-Division Duplex (TDD) manner with scheduling period indication.

A "fourth feature" relates to a polarization changing request (e.g., an indication to change) from the BS to the UE having a time gap (e.g., a space, an opening, a break, etc.).

The system and method disclosed herein provides advantages over conventional systems. For example, known polarization information (sometimes referred to as, "polarization capabilities") of target cell/SSB/beam/BWP may save UEs' processing time and power by avoiding blind try of possible polarization directions. As another example, known polarization information of neighboring cell/SSB/beam/BWP may save UEs' processing time and power by avoiding blind try of possible polarization directions in beam switching. As another example, UEs with different polarization capability in the same area may be served by BS's polarization switching with TDD manner. As another example, polarization may be used as an extra diversity dimension to mitigate interference.

1. Mobile Communication Technology and Environment

FIG. 3 illustrates an example wireless communication network, and/or system, 300 in which techniques disclosed herein may be implemented, in accordance with an embodiment of the present disclosure. In the following discussion, the wireless communication network 300 may be any wireless network, such as a cellular network or a narrowband Internet of things (NB-IoT) network, and is herein referred to as "network 300." Such an example network 300 includes a base station 302 (hereinafter "BS 302"; also referred to as wireless communication node) and a user equipment device 304 (hereinafter "UE 304"; also referred to as wireless communication device) that can communicate with each other via a communication link 310 (e.g., a wireless communication channel), and a cluster of cells 326, 330, 332, 334, 336, 338 and 340 overlaying a geographical area 301. In FIG. 3, the BS 302 and UE 304 are contained within a respective geographic boundary of cell 326. Each of the other cells 330, 332, 334, 336, 338 and 340 may include at least one base station operating at its allocated bandwidth to provide adequate radio coverage to its intended users.

For example, the BS 302 may operate at an allocated channel transmission bandwidth to provide adequate coverage to the UE 304. The BS 302 and the UE 304 may communicate via a downlink radio frame 318, and an uplink radio frame 324 respectively. Each radio frame 318/324 may be further divided into sub-frames 320/327 which may include data symbols 322/328. In the present disclosure, the BS 302 and UE 304 are described herein as non-limiting examples of "communication nodes," generally, which can practice the methods disclosed herein. Such communication nodes may be capable of wireless and/or wired communications, in accordance with various embodiments of the present solution.

Figure 4:
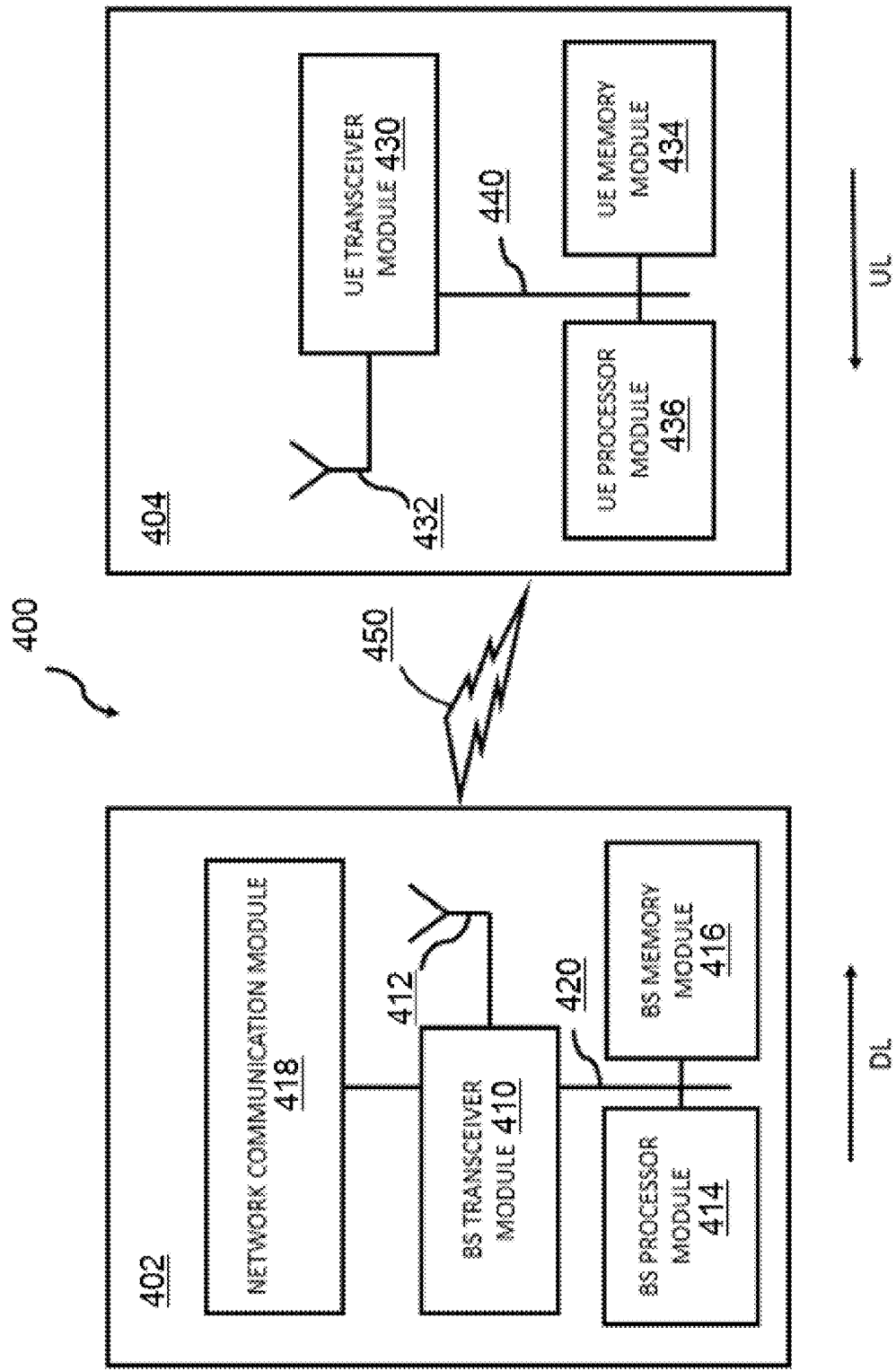
FIG. 4 illustrates block diagrams of an example base station and a user equipment device, in accordance with some embodiments of the present disclosure.

FIG. 4 illustrates a block diagram of an example wireless communication system 400 for transmitting and receiving wireless communication signals (e.g., OFDM/OFDMA signals) in accordance with some embodiments of the present solution. The system 400 may include components and elements configured to support known or conventional operating features that need not be described in detail herein. In one illustrative embodiment, system 400 can be used to communicate (e.g., transmit and receive) data symbols in a wireless communication environment such as the wireless communication environment 300 of FIG. 3, as described above.

System 400 generally includes a base station 402 (hereinafter "BS 402") and a user equipment device 404 (hereinafter "UE 404"). The BS 402 includes a BS (base station) transceiver module 410, a BS antenna 412, a BS processor module 414, a BS memory module 416, and a network communication module 418, each module being coupled and interconnected with one another as necessary via a data communication bus 420. The UE 404 includes a UE (user equipment) transceiver module 430, a UE antenna 432, a UE memory module 434, and a UE processor module 436, each module being coupled and interconnected with one another as necessary via a data communication bus 440. The BS 402 communicates with the UE 404 via a communication channel 450, which can be any wireless channel or other medium suitable for transmission of data as described herein.

As would be understood by persons of ordinary skill in the art, system 400 may further include any number of modules other than the modules shown in FIG. 4. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 430 may be referred to herein as an "uplink" transceiver 430 that includes a radio frequency (RF) transmitter and a RF receiver each comprising circuitry that is coupled to the antenna 432. A duplex switch (not shown) may alternatively couple the uplink transmitter or receiver to the uplink antenna in time duplex fashion. Similarly, in accordance with some embodiments, the BS transceiver 410 may be referred to herein as a "downlink" transceiver 410 that includes a RF transmitter and a RF receiver each comprising circuitry that is coupled to the antenna 412. A downlink duplex switch may alternatively couple the downlink transmitter or receiver to the downlink antenna 212 in time duplex fashion. The operations of the two transceiver modules 410 and 430 may be coordinated in time such that the uplink receiver circuitry is coupled to the uplink antenna 432 for reception of transmissions over the wireless transmission link 450 at the same time that the downlink transmitter is coupled to the downlink antenna 412. Conversely, the operations of the two transceivers 410 and 430 may be coordinated in time such that the downlink receiver is coupled to the downlink antenna 412 for reception of transmissions over the wireless transmission link 450 at the same time that the uplink transmitter is coupled to the uplink antenna 432. In some embodiments, there is close time synchronization with a minimal guard time between changes in duplex direction.

The UE transceiver 430 and the base station transceiver 410 are configured to communicate via the wireless data communication link 450, and cooperate with a suitably configured RF antenna arrangement 412/432 that can support a particular wireless communication protocol and modulation scheme. In some illustrative embodiments, the UE transceiver 410 and the base station transceiver 410 are configured to support industry standards such as the Long Term Evolution (LTE) and emerging 5G standards, and the like. It is understood, however, that the present disclosure is not necessarily limited in application to a particular standard and associated protocols. Rather, the UE transceiver 430 and the base station transceiver 410 may be configured to support alternate, or additional, wireless data communication protocols, including future standards or variations thereof.

In accordance with various embodiments, the BS 402 may be an evolved node B (eNB), a serving eNB, a target eNB, a femto station, or a pico station, for example. In some embodiments, the UE 404 may be embodied in various types of user devices such as a mobile phone, a smart phone, a personal digital assistant (PDA), tablet, laptop computer, wearable computing device, etc. The processor modules 414 and 436 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 414 and 436, respectively, or in any practical combination thereof. The memory modules 416 and 434 may be realized as RAM memory, flash memory, ROM memory, EPROM memory, EEPROM memory, registers, a hard disk, a removable disk, a CD-ROM, or any other form of storage medium known in the art. In this regard, memory modules 416 and 434 may be coupled to the processor modules 410 and 430, respectively, such that the processors modules 410 and 430 can read information from, and write information to, memory modules 416 and 434, respectively. The memory modules 416 and 434 may also be integrated into their respective processor modules 410 and 430. In some embodiments, the memory modules 416 and 434 may each include a cache memory for storing temporary variables or other intermediate information during execution of instructions to be executed by processor modules 410 and 430, respectively. Memory modules 416 and 434 may also each include non-volatile memory for storing instructions to be executed by the processor modules 410 and 430, respectively.

The network communication module 418 generally represents the hardware, software, firmware, processing logic, and/or other components of the base station 402 that enable bi-directional communication between base station transceiver 410 and other network components and communication nodes configured to communication with the base station 402. For example, network communication module 418 may be configured to support internet or WiMAX traffic. In a typical deployment, without limitation, network communication module 418 provides an 802.3 Ethernet interface such that base station transceiver 410 can communicate with a conventional Ethernet based computer network. In this manner, the network communication module 418 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Overview of a Non-Terrestrial Network

Figure 5:
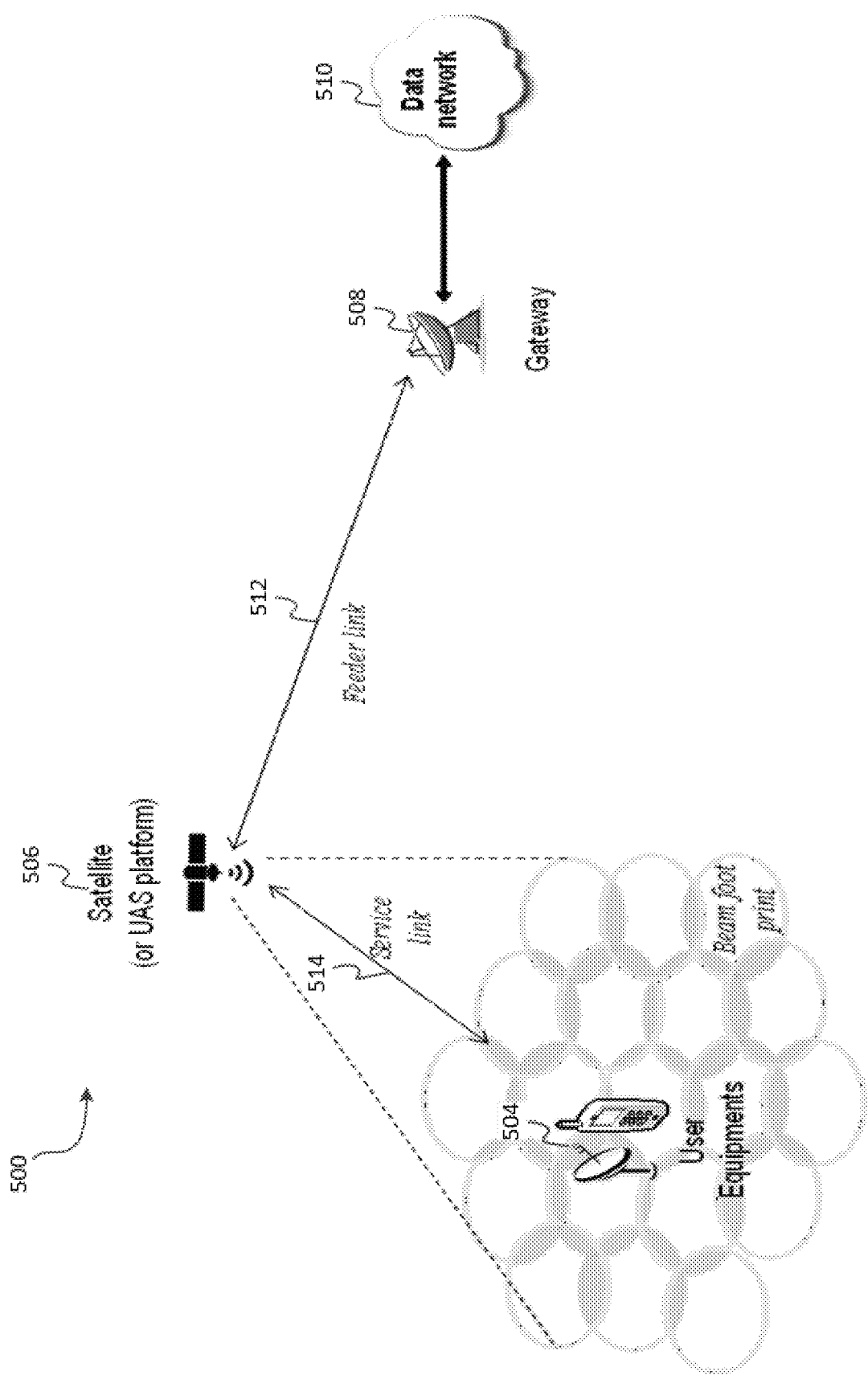
FIG. 5 is a block diagram depicting an example non-terrestrial network based on transparent payload, in accordance with an embodiment of the present disclosure.

FIG. 5 is a block diagram depicting an example non-terrestrial network 500 based on transparent payload, in accordance with an embodiment of the present disclosure. The non-terrestrial network 500 may include a UE 304, a BS 302, and/or a satellite 506. The non-terrestrial network 500 may include a gateway 508 for connecting the non-terrestrial network 500 to a data network 510 (e.g., public or private). A feeder link 512 connects the satellite 506 to the gateway 508. A service link 514 connects the satellite 506 to the UE 504.

In some embodiments, the BS 302 may be positioned on the earth near (e.g., proximate, adjacent) the gateway 508. In some embodiments, the beam footprint may be larger cell than the cell of the non-terrestrial network 500. In some embodiments, a transparent payload may be include a radio frequency filtering, a frequency conversion, and/or an amplification; thus, a waveform signal repeated by the payload may be un-changed.

Figure 6:
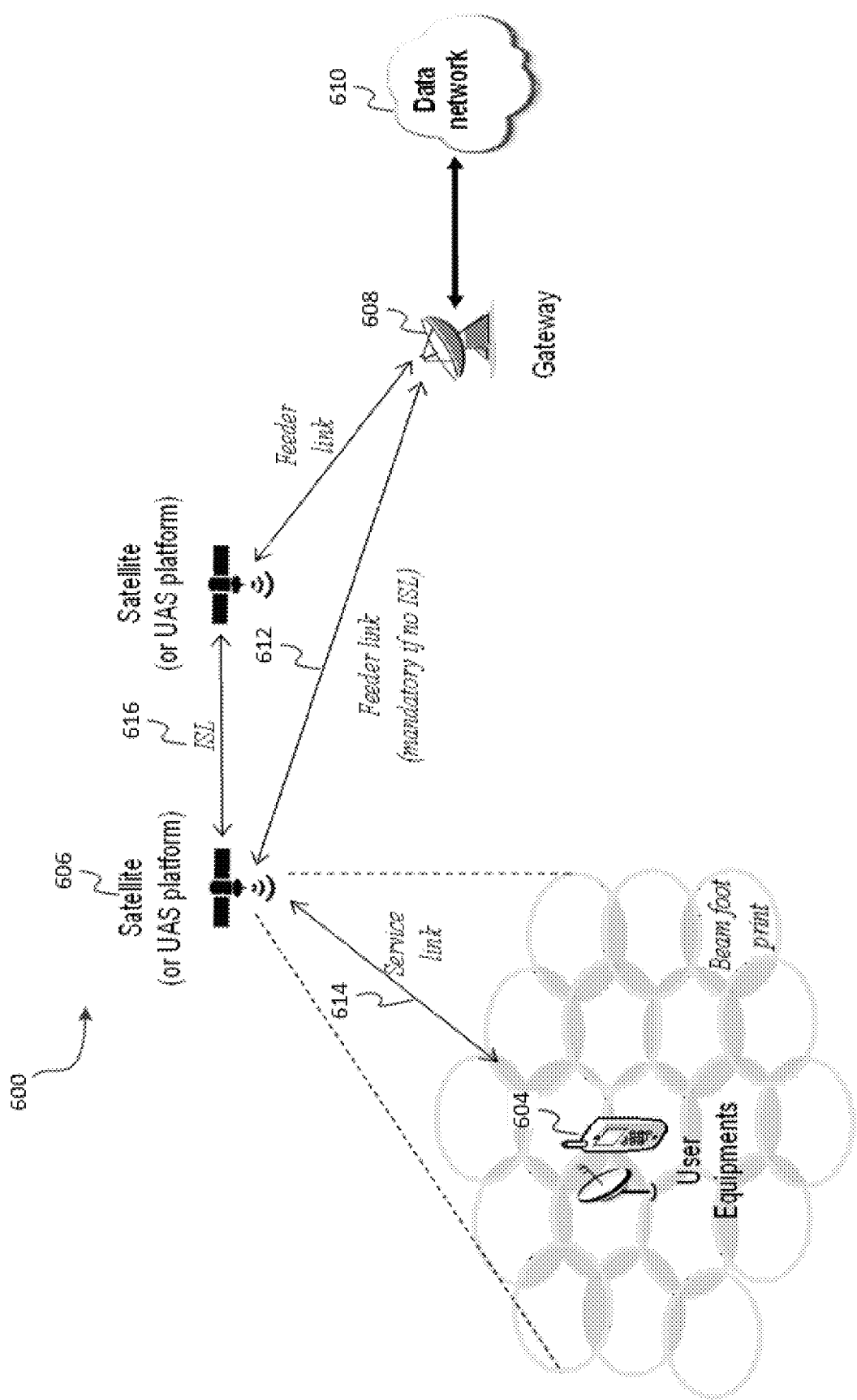
FIG. 6 is a block diagram depicting an example non-terrestrial network based on regenerative payload, in accordance with an embodiment of the present disclosure.

FIG. 6 is a block diagram depicting an example non-terrestrial network 600 based on regenerative payload, in accordance with an embodiment of the present disclosure. The non-terrestrial network 600 may include a UE 304, a BS 302, and/or a satellite 606. The non-terrestrial network 600 may include a gateway 608 for connecting the non-terrestrial network 600 to a data network 610 (e.g., public or private). A feeder link 612 connects the satellite 606 to the gateway 608. A service link 614 connects the satellite 606 to the UE 604. In some embodiments, the BS 302 may be positioned on-board the satellite 606. An inter-satellite link (ISL) 616 connects the satellite 606 to the UE 604. In some embodiments, the BS 302 may be positioned on-board the satellite 606. In some embodiments, the beam footprint may be larger cell than the cell of the non-terrestrial network 600. In some embodiments, a regenerative payload may be include a radio frequency filtering, a frequency conversion, an amplification; demodulation/decoding, switch and/or routing, and/or coding/modulation; thus, all or part of base station functions (e.g., BS 302 in FIG. 3) may be on-board the satellite 606, or UAS platform. In some embodiments, the non-terrestrial network 600 may include a constellation of LEO and/or MEO. In some embodiments, a LEO includes orbit around the Earth with an altitude between 300 kilometers and 1500 kilometers. In some embodiments, a MEO includes a region of space around the Earth above the LEO and below Geostationary Earth Orbit (GEO).

Still referring to FIG. 5 and FIG. 6, satellite 506 and/or satellite 606 may be a geostationary (GEO) satellite or a non-GEO satellite. A GEO satellite may be fed by one or more gateways (e.g., gateway 508, gateway 608) which may be deployed across a satellite targeted coverage (e.g., regional or even continental coverage). In some embodiments, a UE in a cell is served by only one gateway. A non-GEO satellite may be served successively by one or more gateways (e.g., gateway 508, gateway 608) at a time; thereby ensuring that a service link and a feeder link continuity between the successive serving gateways with sufficient time duration to proceed with mobility anchoring and hand-over. In some embodiments, one or more GEO satellites and/or one or more UAS may be used to provide continental, regional and/or local service.

Satellite 506 and/or satellite 606, or a UAS platform, may implement either a transparent or a regenerative (e.g., with on board processing) payload. The satellite 506 and/or satellite 606, or UAS platform, may generate beams over a given service area bounded by its field of view. In some embodiments, the footprints of the beams may be of elliptic shape. The field of view of the satellite 506 and/or satellite 606, or UAS platforms, may depend on the on-board antenna diagram and/or minimum elevation angle.

In some embodiments, a constellation of LEO and/or MEO may be used to provide services in both Northern and Southern hemispheres. In some embodiments, the constellation may provide global coverage including Polar Regions.

3. Overview of UE Capabilities

Figure 7:
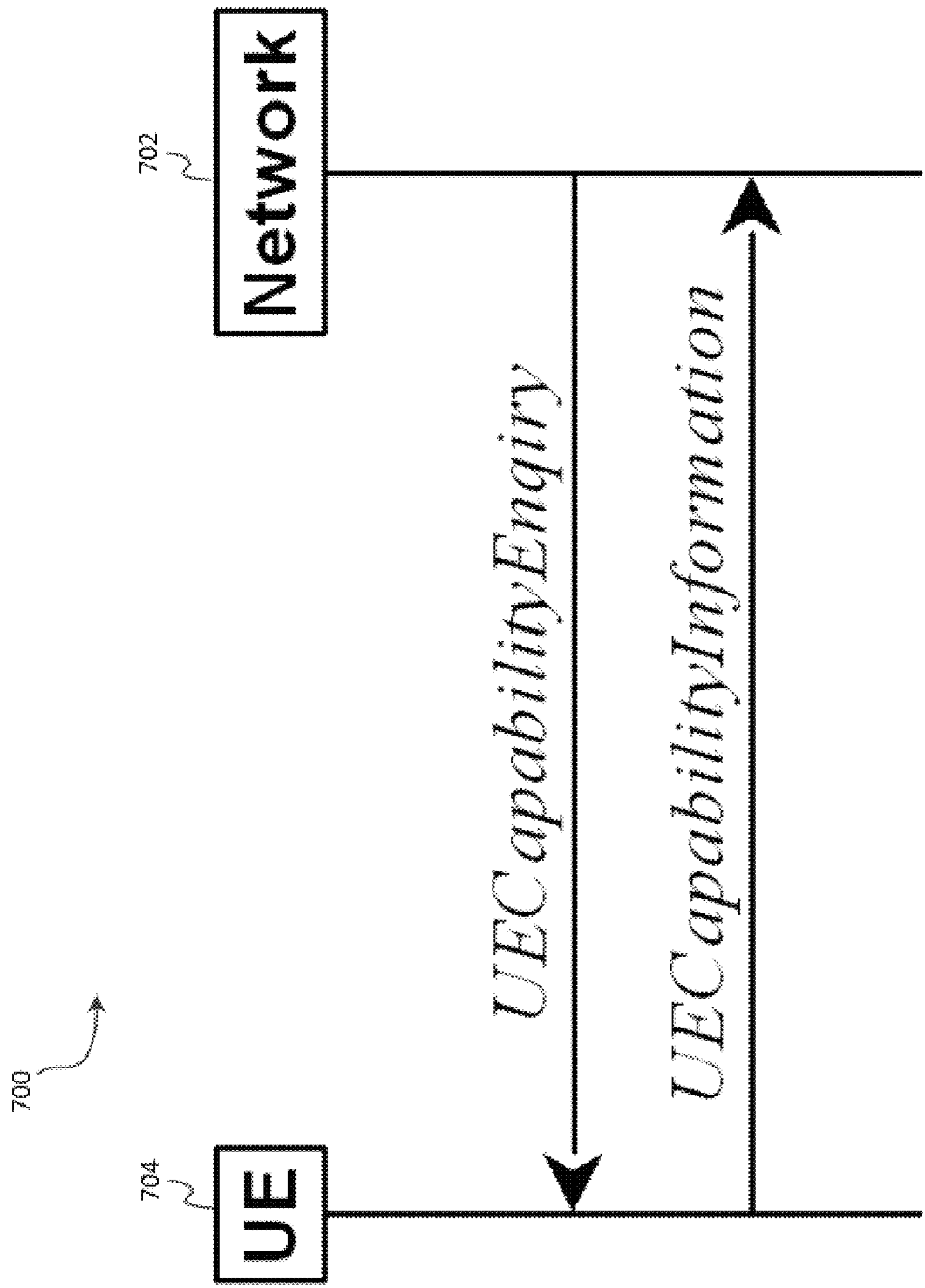
FIG. 7 is a flow diagram of an example transmission of a UE capability report, in accordance with a conventional embodiment.

FIG. 7 is a flow diagram of an example transmission of a UE capability report, in accordance with a conventional embodiment. The flow diagram 700 includes a UE 304 and a BS 302 (shown in FIG. 7 as, "Network 302"). The BS 302 may, in some embodiments, obtain the UE 304 capabilities by sending a UECapabilityEnquiry message to the UE 304, which causes the UE 304 to send a UECapabilityInformation message (sometimes referred to as, "a UE capability report") to the BS 302. In some embodiments, the UECapabilityInformation message may include parameters of the UE 304's capability. In some embodiments, the UECapabilityInformation message does not include polarization supported by the UE 304.

Figure 8:
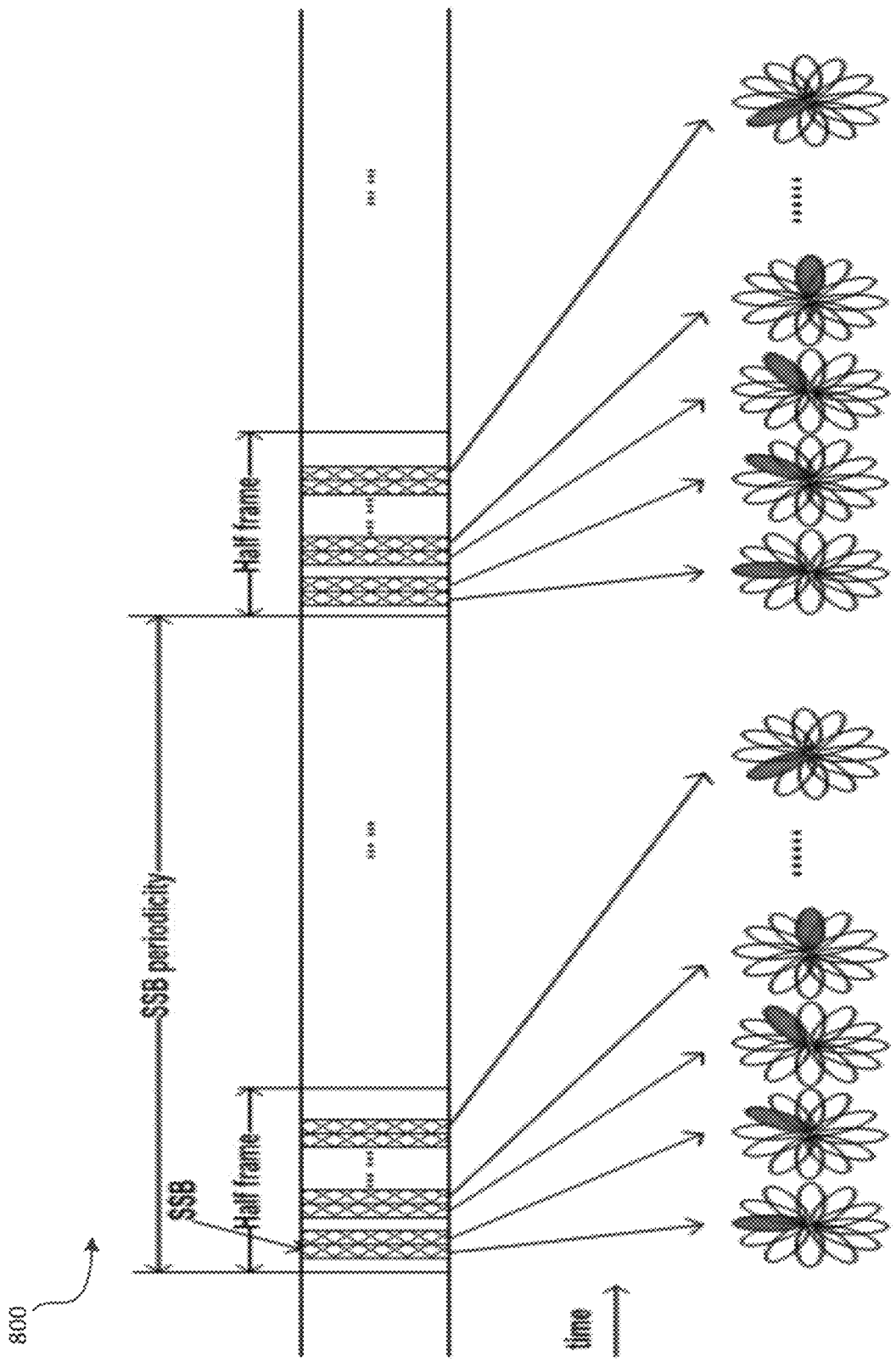
FIG. 8 is a block diagram of an example environment of a 5G NR Synchronization Signal Block (SSB), in accordance with a conventional embodiment.

FIG. 8 is a block diagram of an example environment of a 5G NR Synchronization Signal Block (SSB), in accordance with a conventional embodiment. As shown in the environment 800, multiple SSBs may be transmitted by a BS 302 on the same frequency band, using different beam, and/or on different time interval. A Master Information Block (MIB) in each SSB, in some embodiments, may indicate the frequency-time location of a System Information Block 1 (SIB1). The SIB1 gives information about BWP configurations. However, in the conventional embodiment shown in environment 800, polarization information is not included in the information provided by the SIB1.

4. Improve Resource Switching Efficiency Using Polarization Information

If polarization is used in a resource reuse scheme, the polarization information (e.g., LHCP, RHCP, linear polarization, cross linear polarization, etc.) of neighboring beams may be useful in beam switching. In some NTN scenarios (e.g., LEO, HAPS), the BS (e.g., BS 302 in FIG. 3) on board may move with high speed, which means frequent beam switching needed even for a stationary UE on the ground. In this case, known polarization of target beam may help the UE (e.g., UE 304 in FIG. 3) to complete its beam switching more quickly.

4.1 Case 1: Polarization Information with Broadcast

UE Side Impact

To facilitate beam switching without blindly trying on polarization of the target beam, in some embodiments, the UE 304 may monitor (e.g., observe, track, manage, watch, etc.) the broadcast polarization information from the serving beam.

BS Side Impact

Figure 9A:
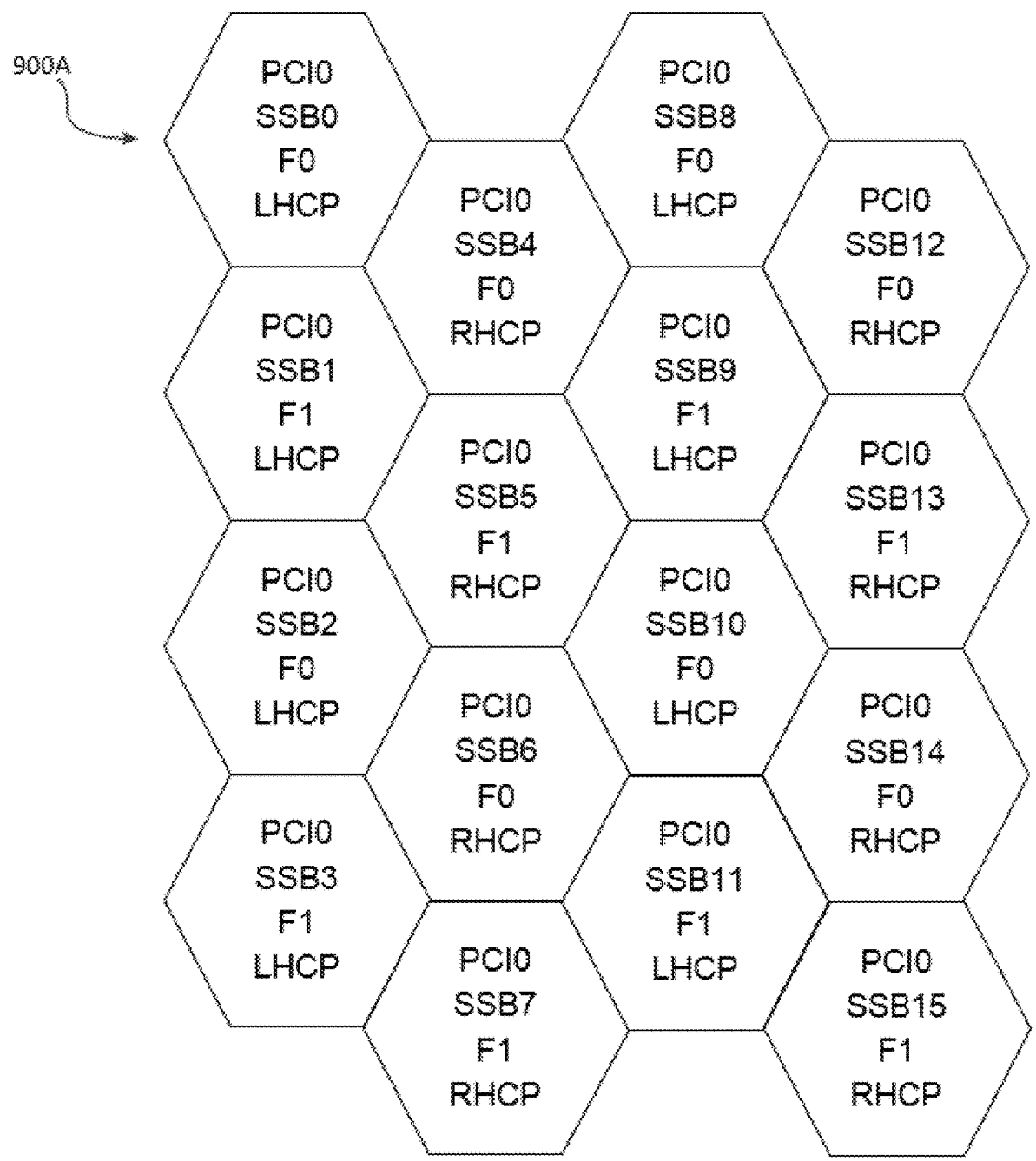
FIG. 9A illustrates a block diagram of an example frequency reuse scheme with 1-N mapping between a cell and SSBs, in accordance with some embodiments of the present disclosure.

FIG. 9A illustrates a block diagram of an example frequency reuse scheme with 1-N mapping between a cell and SSBs, in accordance with some embodiments of the present disclosure. As shown, the frequency reuse scheme 900A includes a Cell 0 (which corresponds to PCI0) that is mapped (e.g., linked, associated, grouped, etc.) to a plurality of SSBs, where each SSBs corresponds to a frequency and/or a polarization capability (sometimes referred to as, "polarization information"). That is, a first frequency (e.g., F0) may be reused across a first group of SSBs (e.g., SSB0, SSB2, SSB4, SSB6, SSB8, SSB10, SSB12, and SSB14), and a second frequency (e.g., F1) may be reused across a second group of SSBs (e.g., SSB1, SSB3, SSB5, SSB7, SSB9, SSB11, SSB13, and SSB15). A first polarization capability (e.g., LHCP) may correspond with a third group of SSBs (e.g., SSB0, SSB1, SSB2, SSB3, SSB8, SSB9, SSB10, and SSB11), and a second polarization capability (e.g., RHCP) may correspond with a fourth group of SSBs (e.g., SSB4, SSB5, SSB6, SSB7, SSB12, SSB13, SSB14, and SSB15). In some embodiments, one or both of the frequencies (e.g., F0 and F1), may be different in order to reduce interference between the cells. Although FIG. 9A only shows the frequency reuse scheme of one cell mapped to a select number of SSBs, frequencies, and polarization capabilities, any number of SSBs, frequencies, and polarization capabilities may be used.

Figure 9B:
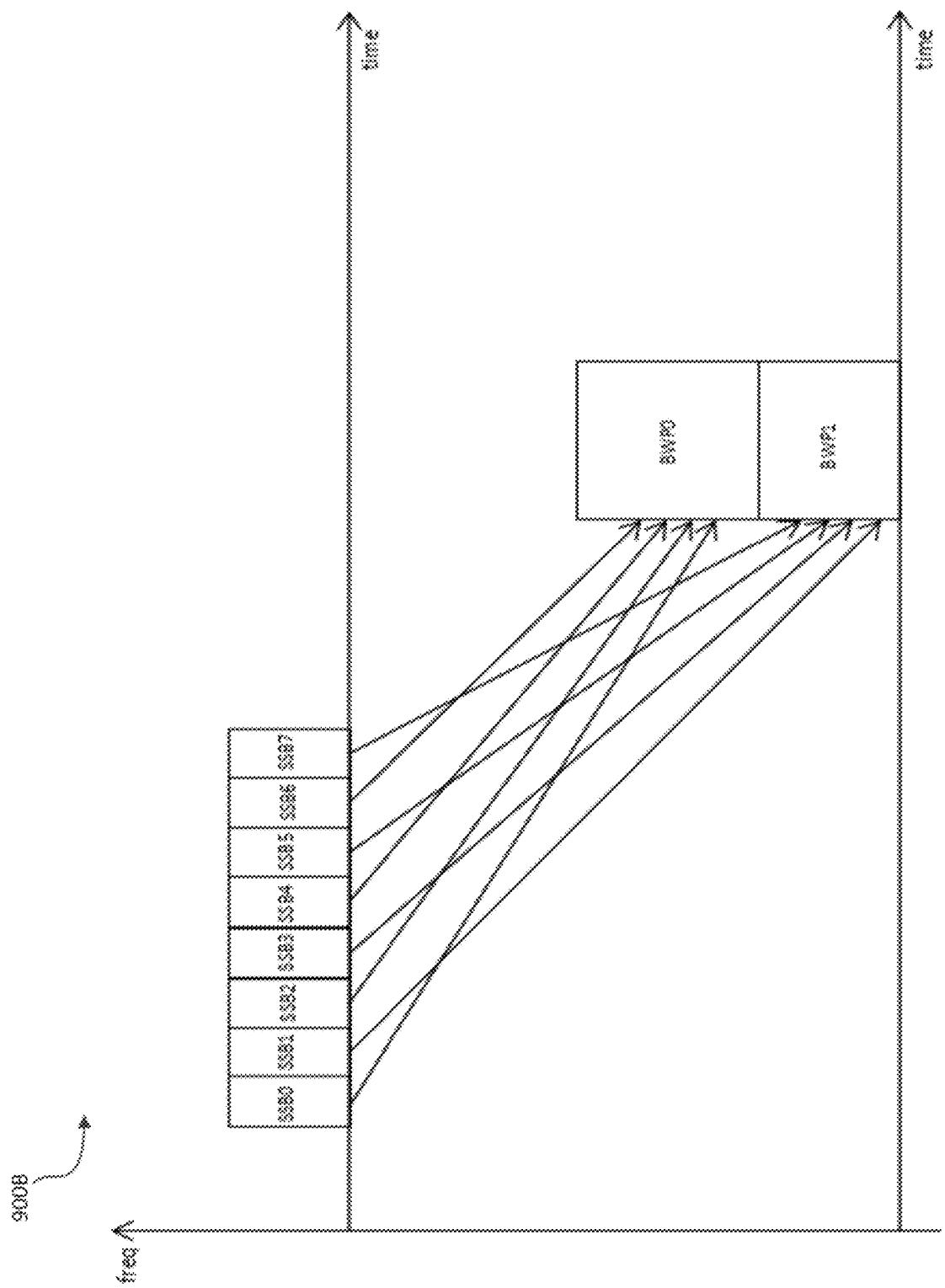
FIG. 9B illustrates a block diagram of an example environment for BWPs for each SSB with respect to the frequency reuse scheme 900A in FIG. 9A, in accordance with some embodiments of the present disclosure.

FIG. 9B illustrates a block diagram of an example environment for BWPs for each SSB with respect to the frequency reuse scheme 900A in FIG. 9A, in accordance with some embodiments of the present disclosure. If a 1-to-N mapping between cell and SSB is used, then beam switching may occur in the coverage of the same cell. Hence, the cell-level handover may be reduced, which is desirable from the viewpoint of higher layer signaling saving and resource switching efficiency.

The frequency/polarization of each beam may, in some embodiments, be different in a given cell. As shown in FIG. 9B, the SSB index has been marked as an example. In this example, 2 BWPs can be used to realize the frequency reuse. In some embodiments, the frequency resource of SSB and BWP0/BWP1 can be different. The MIB in each SSB, in some embodiments, indicates the frequency-time location of SIB1. The SIB1, in some embodiments, gives information about BWP configurations.

4.1.1 Embodiment(s) 1-a: SSB Resource with the Same Frequency and the Different Polarization Still referring to FIG. 9B, in some embodiments, multiple SSBs may be broadcast in the same frequency resource with time domain multiplexing. In different beam coverage, in some embodiments, the same frequency resource may be reserved for SSB broadcast. In different beam coverage, in some embodiments, transmission other than SSB may use different frequency resource according to beam deployment. The polarization of SSB transmission, in some embodiments, may be the same as other transmission in a given beam. After successful decoding of SSB, in some embodiments, the UE 304 (e.g., assumed stationary for simplicity) on the ground may know the polarization and/or the frequency-time location of SIB1 of corresponding beam. With the moving of BS 302 on-board, in some embodiments, another beam is coming to cover the UE 304. If polarization of the neighboring beams can be informed to the UE 304, in some embodiments, the UE 304 does not need to blindly try possible polarization of coming beam's SSB in its measurement. Since the beam switching caused by moving BS 302 on-board impacts all UEs 304 in a given geographic area, the polarization of the neighboring beams may, in some embodiments, be broadcast (e.g., in SIBx). To save signaling overhead, in some embodiments, the polarization can also be bundled (e.g., grouped, linked, associated, etc.) with SSB index, which may be presented using a formula known by both the BS 302 and the UEs 304.

Figure 10:
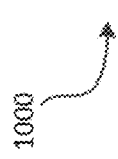
FIG. 10 illustrates a table of example mapping rules between cell identifier/SSB index/beam index/BWP index and polarization, in accordance with an embodiment of the present disclosure.

FIG. 10 illustrates a table of example mapping rules between cell identifier/SSB index/beam index/BWP index and polarization, in accordance with an embodiment of the present disclosure. In some embodiments, the mapping rules depicted in table 1000 may be a configuration information element in handover signaling, MIB, and/or SIBx.

4.1.2 Embodiment(s) 1-b: SSB Resource with the Same Frequency and the Same Polarization Still referring to FIG. 9B, in some embodiments, multiple SSBs may be broadcast in the same frequency resource with time domain multiplexing. In different beam coverage, in some embodiments, the same frequency resource is reserved for SSB broadcast. In different beam coverage, in some embodiments, transmission other than SSB may use different frequency resource according to beam deployment. In some embodiments, the polarization of all SSBs is the same. In some embodiments, the benefit may be that UEs 304 can decode different SSBs with a fixed polarization and frequency resource. As a result, in some embodiments, the polarization of a given SSB can be different from that used by other transmission in its corresponding beam. After successful decoding of SSB, in some embodiments, a UE 304 (assumed stationary for simplicity) on the ground knows the frequency-time location of SIB1 of corresponding beam, but does not know the polarization of that SIB1. If the polarization of this beam can be informed to the UE 304, in some embodiments, the UE 304 does not need to blindly try possible polarization and can save processing time and power. Since the polarization of the beam impacts all the UEs 304 in a given geographic area, in some embodiments, the polarization of the beam shall be broadcast (e.g., in MIB). To save signaling overhead, in some embodiments, the polarization can also be bundled with SSB index, which may be presented using a formula known by both BS 302 and the UEs 304.

As discussed above, FIG. 10 illustrates a table of example mapping rules between cell identifier/SSB index/beam index/BWP index and polarization, in accordance with an embodiment of the present disclosure. In some embodiments, the mapping rules depicted in table 1000 may be a configuration information element in handover signaling, MIB, and/or SIBx.

4.2 Case 2: Frequency Resource and/or Polarization Information with Broadcast

UE Side Impact

To facilitate beam switching without blindly trying on polarization of the target beam, in some embodiments, the UE 304 may monitor (e.g., observe, track, manage, watch, etc.) the broadcast polarization information from the serving beam.

BS Side Impact

Figure 11:
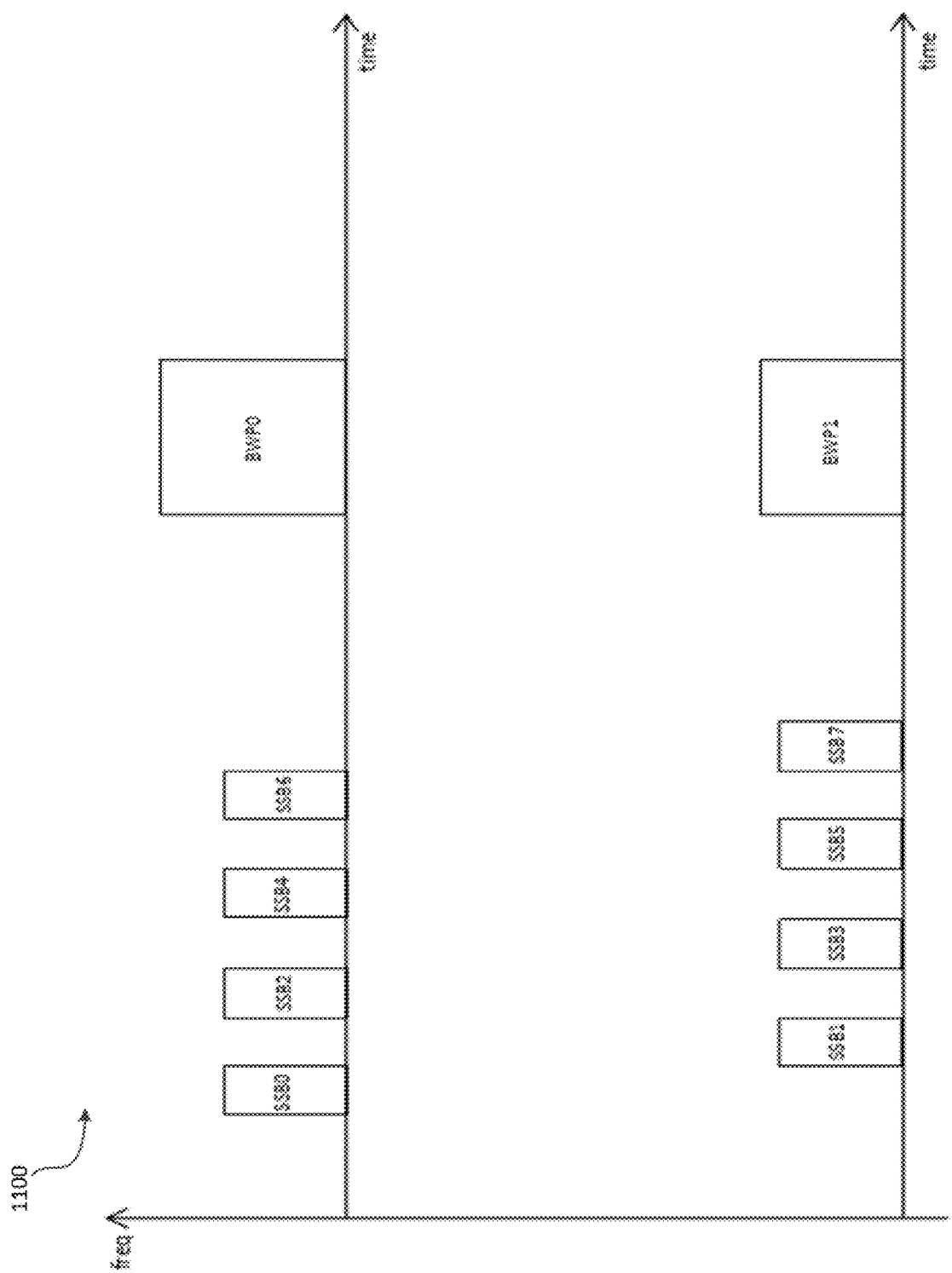
FIG. 11 illustrates a block diagram of an example environment for SSBs on different frequency resources with respect to the frequency reuse scheme 900A in FIG. 9A, in accordance with some embodiments of the present disclosure.

FIG. 11 illustrates a block diagram of an example environment for SSBs on different frequency resources with respect to the frequency reuse scheme 900A in FIG. 9A, in accordance with some embodiments of the present disclosure. If a 1-to-N mapping between cell and SSB is used, then beam switching may occur in the coverage of the same cell. Hence, the cell-level handover may be reduced, which is desirable from the viewpoint of higher layer signaling saving and resource switching efficiency.

4.2.1 Embodiment(s) 2-a: SSB Resource with the Polarization

In a given beam coverage, in some embodiments, SSB and other transmissions may use the same frequency resource according to beam deployment. For example, FIG. 11 shows two groups of SSBs, where group 0 includes SSB0/2/4/6 and group 1 includes SSB1/3/5/7. In this way, in some embodiments, the SSBs are located in the same frequency resource with other transmission in a given beam. In some embodiments, the polarization of SSBs in a group may be the same (e.g., SSB0/2/4/6 use LHCP). As a result, in some embodiments, the polarization of a given SSB can be different from that used by other transmission in its corresponding beam (e.g., RHCP is used in beams corresponding to SSB4/6). After successful decoding of SSB, in some embodiments, a UE 304 (assumed stationary for simplicity) on the ground knows the frequency-time location of SIB1 of corresponding beam, but does not know the polarization of that SIB1. If the polarization of this beam can be informed to the UE 304, in some embodiments, the UE 304 does not need to blindly try possible polarization and can save processing time and power. Since the polarization of the beam may impact all UEs in a given geographic area, in some embodiments, the polarization of the beam may be broadcast (e.g., in MIB). To save signaling overhead, in some embodiments, the polarization can also be bundled with SSB index, which may be presented using a formula known by both the BS 302 and the UEs 304.

As discussed above, FIG. 10 illustrates a table of example mapping rules between cell identifier/SSB index/beam index/BWP index and polarization, in accordance with an embodiment of the present disclosure. In some embodiments, the mapping rules depicted in table 1000 may be a configuration information element in handover signaling, MIB, and/or SIBx.

4.2.2 Embodiment(s) 2-b: SSB Group Resource with Different Polarization

In a given beam coverage, in some embodiments, SSB and other transmissions may use the same frequency resource according to beam deployment. For example, FIG. 11 shows two groups of SSBs, SSBs are broadcast in different frequency resource with possible time domain multiplexing. In some embodiments, the polarization of a SSB may be the same as that used by other transmission in its corresponding beam (e.g., LHCP is used by both SSB0/1/2/3 and other transmission in corresponding beams). After successful decoding of SSB, in some embodiments, a UE 304 (assumed stationary for simplicity) on the ground knows the both the frequency-time location and polarization of SIB1 of corresponding beam. With the moving of BS on-board, in some embodiments, another beam is coming to cover the UE 304. If polarization of the neighboring beams can be informed to the UE 304, in some embodiments, the UE 304 does not need to blindly try possible polarization of coming beam's SSB in its measurement. Since the beam switching caused by moving BS on-board impacts all the UEs 304 in a given geographic area, in some embodiments, the polarization of the neighboring beams can be broadcast (e.g., in SIBx). To save signaling overhead, in some embodiments, the polarization can also be bundled with SSB index, which may be presented using a formula known by both the BS 302 and the UEs 304.

As discussed above, FIG. 10 illustrates a table of example mapping rules between cell identifier/SSB index/beam index/BWP index and polarization, in accordance with an embodiment of the present disclosure. In some embodiments, the mapping rules depicted in table 1000 may be a configuration information element in handover signaling, MIB, and/or SIBx.

5. Support UEs with Limited Polarization Capability Using Polarization Information In some embodiments, some UEs 304 may have limited polarization capability (e.g., LHCP only or RHCP only). To support the UEs 304 with limited polarization capability, in some embodiments, the BS 302 may use time division duplex (TDD) to cover an area with either LHCP or RHCP at a given time. In this case, in some embodiments, the BS 302 may be informed (e.g., notified, alerted, etc.) by the UE 304 about its polarization capability. That is, the UE 304 may send a message to the BS 302 that indicates the polarization capability of the UE 304.

5.1 Case 3: Support of UEs with Limited Polarization Capability

UE Side Impact

To facilitate BS scheduling, in some embodiments, the UE 304 may inform its polarization capability to the BS 302, which may include, for example, information indicating linear polarization, cross linear polarization, left hand circular polarization (LHCP), and/or right hand circular polarization (RHCP). Furthermore, in some embodiments, the polarization capability on the transmitting direction, the receiving direction, or the both directions may be indicated. This polarization capability, in some embodiments, may be reported to the BS 302 using a UECapabilityInformation message, that is, to add the polarization capability (as discussed herein) into an UE-NR-Capability information element.

BS Side Impact

If the BS 302 has information about UE's polarization capability, in some embodiments, it can group the UEs 302 according to their polarization capability. Time division duplex (TDD) at the BS 302, in some embodiments, can be used to serve the UEs 302 with different polarization capability in a given spot beam. For example, the BS 302 may indicate to a LHCP-only UE 304 with an extra TDD period to realize semi-static persistent (SSP) DL/UL grant. As another example, the BS 302 may indicate to a LHCP-only UE with an extra TDD period to realize periodic break in repetition-based transmission.

6. Improve Network Performance Using Polarization Information

If polarization is not used in resource reuse scheme, in some embodiments, then it may be possible to use it as an extra diversity dimension to improve network performance. For example, polarization can be used in interference mitigation.

6.1 Case 4: Interference Mitigation with Polarization Multiplexing

UE Side Impact

To facilitate interference mitigation using polarization isolation, in some embodiments, a UE 304 may inform its polarization capability to the BS 302, which may include, for example, information indicating linear polarization, cross linear polarization, left hand circular polarization (LHCP), and/or right hand circular polarization (RHCP). Furthermore, in some embodiments, the polarization capability on the transmitting direction, the receiving direction, or the both directions may be indicated. This polarization capability, in some embodiments, may be reported to the BS 302 using a UECapabilityInformation message, that is, to add the polarization capability (as discussed herein) into an UE-NR-Capability information element.

BS Side Impact

If the BS 302 has information about the UE's 304 polarization capability, in some embodiments, it can use this to mitigate interference. Besides, in some embodiments, time, frequency, spatial isolation, and/or polarization may work as another isolation dimension. Therefore, in some embodiments, the BS 302 may indicate UE the circular polarization direction used in UL/DL transmission.

After a UE 304 receives the indication from the BS 302 to change its polarization, in some embodiments, the BS 302 may allow a time gap before the UE's polarization change taking effect. The time gap length, in some embodiments, may be related to round trip propagation delay and/or the processing delay at UE 304 and/or BS 302 sides.

In some embodiments, the polarization capabilities indicate that the UE 304 supports only single polarization (RHCP-only or LHCP-only), which is the same polarization as reported in the polarization capability that is expected to be used by the UE 304 for the communications (uplink and downlink) between the UE 304 and the BS 302.

7. Methods for Implementing Exemplary Embodiments from Cases 1-4

Figure 12:
FIG. 12 is a flow diagram depicting a method for improving resource switching efficiency by using polarization capabilities of beams within a network, in accordance with some embodiments of the present disclosure.
Figure 12:

FIG. 12 is a flow diagram depicting a method for improving resource switching efficiency by using polarization capabilities of beams within a network, in accordance with some embodiments of the present disclosure. Additional, fewer, or different operations may be performed in the method depending on the particular embodiment. In some embodiments, some or all operations of method 1200 may be performed by a wireless communication node, such as BS 302 in FIG. 3. In some operations, some or all operations of method 1200 may be performed by a wireless communication device, such as UE 304 in FIG. 3. Each operation may be re-ordered, added, removed, or repeated.

As shown, the method 1200 includes, in some embodiments, the operation 1202 of receiving, by a wireless communication device from a base station, polarization information. The method includes, in some embodiments, the operation 1204 of respectively reporting, by the wireless communication device to the base station, polarization capabilities of the wireless communication device.

Figure 13:
FIG. 13 is a flow diagram depicting a method for improving resource switching efficiency by using polarization capabilities of beams within a network, in accordance with some embodiments of the present disclosure.
Figure 13:

FIG. 13 is a flow diagram depicting a method for improving resource switching efficiency by using polarization capabilities of beams within a network, in accordance with some embodiments of the present disclosure. Additional, fewer, or different operations may be performed in the method depending on the particular embodiment. In some embodiments, some or all operations of method 1300 may be performed by a wireless communication node, such as BS 302 in FIG. 3. In some operations, some or all operations of method 1300 may be performed by a wireless communication device, such as UE 304 in FIG. 3. Each operation may be re-ordered, added, removed, or repeated.

As shown, the method 1300 includes, in some embodiments, the operation 1302 of transmitting, by a base station to a wireless communication device, polarization information. The method includes, in some embodiments, the operation 1304 of respectively receiving, by the base station from the wireless communication device, polarization capabilities of the wireless communication device.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device.

A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A wireless communication method, comprising:
    receiving, by a wireless communication device from a base station supporting non-terrestrial network access, polarization information,
    wherein receiving the polarization information comprises monitoring, by the wireless communication device, the polarization information in a signaling from the base station, and wherein the signaling comprises a system information block (SIB),
    wherein the polarization information comprises at least one of linear polarization, Left Hand Circular Polarization (LHCP), or Right Hand Circular Polarization (RHCP), and
    wherein the signaling indicates an association between the polarization information and at least one of downlink or uplink transmissions between the wireless communication device and base station,
    wherein the association corresponds to a mapping rule between resource indexes and polarization;
    the mapping rule comprises:

$$\left\lfloor \frac{Index_{resource}}{N} \right\rfloor = \text{even; and}$$

$$\left\lfloor \frac{Index_{resource}}{N} \right\rfloor = \text{odd,}$$

respectively mapped to a specified polarization;
    wherein N is a first configurable parameter and an integer number greater than or equal to 2.

2. The method of claim 1, wherein the polarization information is for a resource comprising one or more of a cell, a target spot beam, neighboring beams, or Bandwidth Part (BWP).

3. A wireless communication method, comprising:
    transmitting, by a base station supporting non-terrestrial network access, to the wireless communication device, polarization information,
    wherein transmitting the polarization information comprising transmitting, by the base station, a signaling that comprises the polarization information, wherein the signaling comprises a system information block (SIB),
    wherein the polarization information comprises at least one of linear polarization, Left Hand Circular Polarization (LHCP), or Right Hand Circular Polarization (RHCP), and
    wherein the signaling indicates an association between the polarization information and at least one of downlink or uplink transmissions between the wireless communication device and base station,
    wherein the association corresponds to a mapping rule between resource indexes and polarization;
    the mapping rule comprises:

$$\left\lfloor \frac{Index_{resource}}{N} \right\rfloor = \text{even; and}$$

$$\left\lfloor \frac{Index_{resource}}{N} \right\rfloor = \text{odd,}$$

respectively mapped to a specified polarization;
    wherein N is a first configurable parameter and an integer number greater than or equal to 2.

4. The method of claim 3, wherein the polarization information is for a resource comprising one or more of a cell, a target spot beam, neighboring beams, or Bandwidth Part (BWP).

5. A wireless communication device, comprising:
    at least one processor configured to:
        receive, via a receiver from a base station supporting non-terrestrial network access, polarization information, wherein receiving the polarization information comprises monitoring the polarization information being received in a signaling from the base station, wherein the signaling comprises a system information block (SIB), wherein the polarization information comprises at least one of linear polarization, Left Hand Circular Polarization (LHCP), or Right Hand Circular Polarization (RHCP), and wherein the signaling indicates an association between the polarization information and at least one of downlink or uplink transmissions between the wireless communication device and base station, wherein the association corresponds to a mapping rule between resource indexes and polarization;

the mapping rule comprises:

$$\left\lfloor \frac{Index_{resource}}{N} \right\rfloor = \text{even; and}$$

$$\left\lfloor \frac{Index_{resource}}{N} \right\rfloor = \text{odd},$$

respectively mapped to a specified polarization;

wherein N is a first configurable parameter and an integer number greater than or equal to 2.

6. The wireless communication device of claim 5, wherein the polarization information is for a resource comprising one or more of a cell, a target spot beam, neighboring beams, or Bandwidth Part (BWP).

7. A base station, comprising:

at least one processor configured to:

transmit, via a transmitter to the wireless communication device, polarization information, wherein the base station supports non-terrestrial network access, wherein transmitting the polarization information comprises transmitting the polarization information via a signaling, wherein the signaling comprises a system information block (SIB), wherein the polarization information comprises at least one of linear polarization, Left Hand Circular Polarization (LHCP), or Right Hand Circular Polarization (RHCP), wherein the signaling indicates an association between the polarization information and at least one of downlink or uplink transmissions between the wireless communication device and base station, wherein the association corresponds to a mapping rule between resource indexes and polarization;

the mapping rule comprises:

$$\left\lfloor \frac{Index_{resource}}{N} \right\rfloor = \text{even; and}$$

$$\left\lfloor \frac{Index_{resource}}{N} \right\rfloor = \text{odd},$$

respectively mapped to a specified polarization;

wherein N is a first configurable parameter and an integer number greater than or equal to 2.

8. The base station of claim 7, wherein the polarization information is for a resource comprising one or more of a cell, a target spot beam, neighboring beams, or Bandwidth Part (BWP).

* * * * *